United States Patent [19]

Ishikawa et al.

[11] 4,077,375
[45] Mar. 7, 1978

[54] FUEL VAPORIZER

[75] Inventors: Katuichi Ishikawa, Musashi-murayama; Yuji Sakakibara, Koganei; Hiraki Sawada, Seki; Kizuku Otsubo, Kokubunji, all of Japan

[73] Assignee: Nissan Motor Company, Limited, Japan

[21] Appl. No.: 666,681

[22] Filed: Mar. 15, 1976

[30] Foreign Application Priority Data

Mar. 17, 1975 Japan ............................ 50-31082

[51] Int. Cl.² .......................................... F02M 31/00
[52] U.S. Cl. ..................... 123/122 AB; 123/122 AC; 261/144
[58] Field of Search ................ 123/122 AB, 122 AC, 123/32 SP, 32 ST, 52 M; 261/144, 145

[56] References Cited

U.S. PATENT DOCUMENTS

| 2,745,394 | 5/1956 | Holley | 123/122 AC |
| 3,832,984 | 9/1974 | Taguchi | 123/122 AC |
| 3,886,918 | 6/1975 | Cole | 123/122 AC |
| 3,971,352 | 7/1976 | Marsee | 123/122 AC |

Primary Examiner—Ronald H. Lazarus

[57] ABSTRACT

A fuel vaporizer for internal combustion engines employs a chamber exposed to and directly below the underside of the engine carburetor and a heater wall at the bottom of the chamber to receive drops of fuel released from the engine carburetor into the intake manifold. It also includes an apertured wall having an upperside forming the bottom of the intake manifold riser and an underside forming the top of the chamber. The heater wall may be heated by exhaust gases or bypassed water from the cooling system of the engine. The chamber is shallow so that surface of the heater wall of volume of the chamber will be high enough for rapid evaporation of fuel. The drops of fuel released from the engine carburetor drop down directly onto the heater wall and fuel vapor flows out of the chamber into the intake manifold. The apertured wall is not formed with holes in the peripheral area thereof to prevent the drops of fuel from splashing and/or spilling out of the chamber into the intake manifold.

4 Claims, 3 Drawing Figures 4,077,375

FUEL VAPORIZER

The present invention relates to a fuel vaporizer for an internal combustion engine, and more particularly to a fuel vaporizer for an internal combustion engine of the type in which an auxiliary combustion chamber is associated with each main combustion chamber and connected by a torch nozzle.

It is known that carburetors of internal combustion engines release a mixture of fuel vapor and droplets into the intake manifold which is directly below the carburetor and that less than one half the fuel released into the intake manifold is actually vaporized as it leaves the carburetor. Some of the droplets of fuel enter the engine cylinders and due to their low surface to volume ratio they are incompletely combusted in the short time available in the operating cycle. This incomplete combustion is especially a problem in the start up of the engine operation, depending upon the atmospheric temperature, and the operation with choke, i.e., rich mixtures, and is therefore a major cause of exhaust emissions. This has been alleviated to some extent in multi-cylinder engines by heating the bottom of the intake manifold riser with exhaust gases or bypass water from the cooling system to effect better fuel vaporization. This method however can not help preventing some of the droplets of fuel from entering each engine cylinder because it takes time to vaporize all the droplets due to the large heat mass of the heat riser, thus increasing the exhaust emission as well as deteriorating the engine operation.

This is more serious in torch ignition internal combustion engines in which an auxiliary combustion chamber is associated with each main combustion chamber and a small amount of rich air fuel mixture enters each auxiliary combustion chamber through an auxiliary intake manifold because fuel droplets released by an auxiliary carburetor into the auxiliary intake manifold are not sufficiently vaporized within the riser of auxiliary intake manifold and fuel tends to enter the auxiliary combustion chamber in the form of liquid drops.

An object of the present invention is to provide an improved device to vaporize the fuel supplied to the cylinders of the internal combustion engine to ensure stable operation of the engine and to reduce exhaust emissions from the engine.

Another object of the present invention is to provide an improved fuel vaporizer particularly suitable for application to an auxiliary intake manifold of the torch ignition internal combustion engine.

In the present invention there is provided a chamber with a heater wall at the bottom exposed to and directly below the underside of the engine carburetor through an apertured wall which forms the riser bottom of the intake manifold of the engine. This heater wall may be heated by the exhaust gases or bypass water from the cooling system of the engine or some other means.

Further details and features of the present invention will be described hereinafter with reference to the accompanying drawings, in which.

Figure 1:
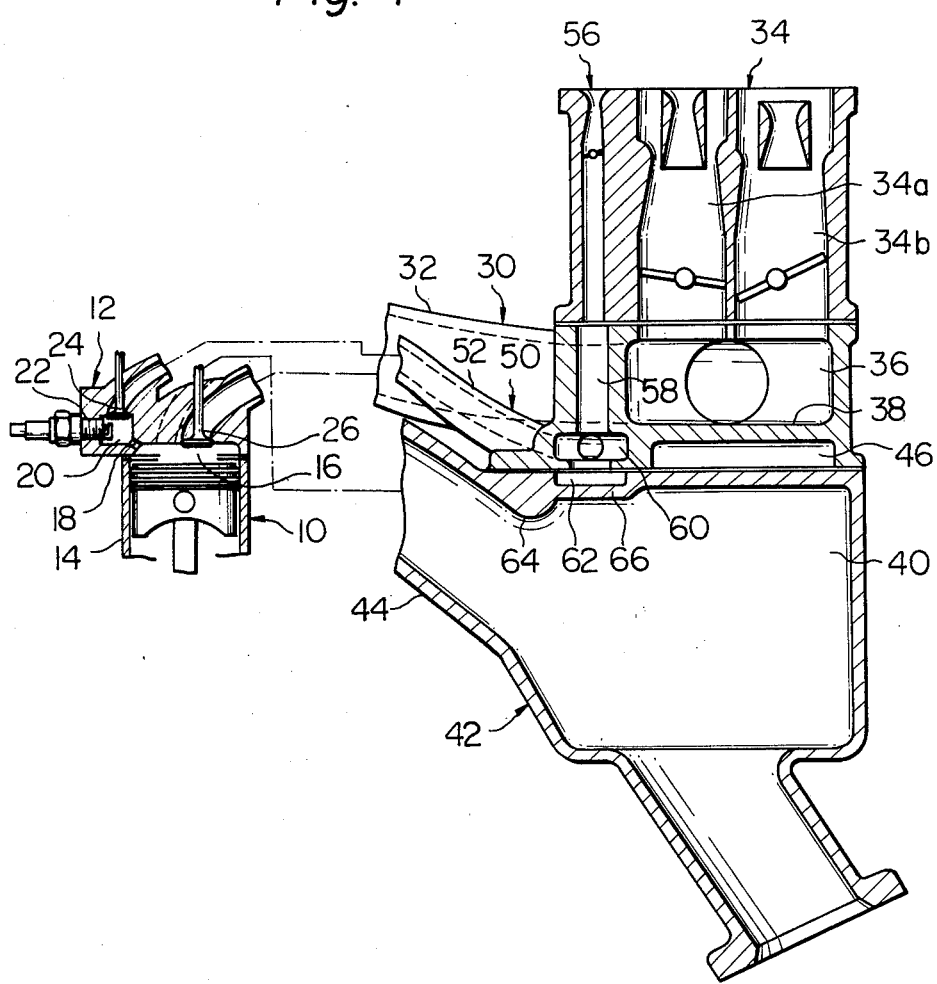
FIG. 1 is a sectional side view of a torch ignition internal combustion engine, illustrating intake and exhaust manifolds of the engine including an auxiliary intake manifold with which a preferred embodiment of a fuel vaporizer according to the present invention is assembled.

Referring particularly to FIG. 1, the internal combustion engine includes an engine block 10 having one or more cylinders capped by an engine head 12. Each cylinder is provided with a piston 14, and the head 12 forms with the cylinder and piston, a main combustion chamber 16 connected through a torch passage 18 to an auxiliary combustion chamber 20 provided in the engine head 12. Each auxiliary combustion chamber is provided with a spark plug 22.

The combustion process proceeds by firstly sucking a rich air-fuel mixture into the auxiliary combustion chamber 20 under the control of an auxiliary intake valve 24 and a lean air-fuel mixture into the main combustion chamber 16 under the control of a main intake valve 26. The rich air-fuel mixture within the auxiliary combustion chamber 20 is ignited by the spark plug 22. The burning fuel is thereby injected through the torch passage 18 into the main combustion chamber 16. This injection of the burning fuel brings about combustion of the lean air-fuel mixture within the main combustion chamber 16.

Reference numeral 30 designates a main intake manifold and this intake manifold is provided with several branches or passages, only one being shown at 32 in FIG. 1, each of which leads to at least one of the engine cylinders to that fuel supplied from the underside of a main carburetor 34 having two throats 34a and 34b is supplied to all of the main combustion chambers, such as 16, of the engine. Some of the fuel supplied from the underside the main carburetor 34 is in vaporized form and this mixed with air enters a riser 36 of the main intake manifold 30 and then enters the different passages to the main combustion chambers 16. However, some of the fuel leaving the carburetor 34 is in the form of liquid drops and these drop down onto the bottom 38 of the riser 36. The riser 36 of the main intake manifold 30 is mounted on a central portion 40 of an exhaust manifold 42 provided with passages, only one being shown in FIG. 1 at 44, each of which leads to at least one main combustion chamber 16 so that the riser bottom 38 may be heated by exhaust gases. A space 46 is provided below the riser bottom 38 prevent the intake air from being overheated so as to minimize reduction of the number of air-fuel molecules that enter each main combustion chamber 16.

Figure 2:
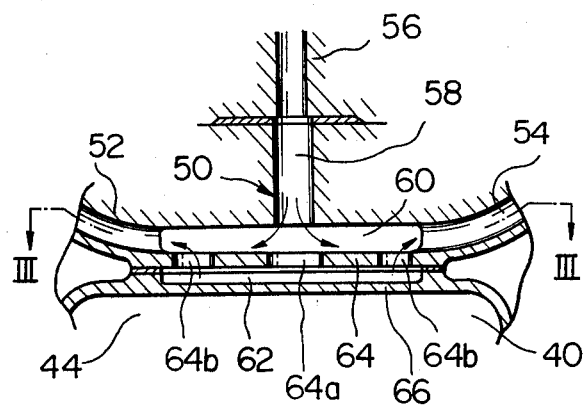
FIG. 2 is a vertical sectional view showing the vaporizer positioned between the auxiliary intake and exhaust manifolds of the engine.
Figure 3:
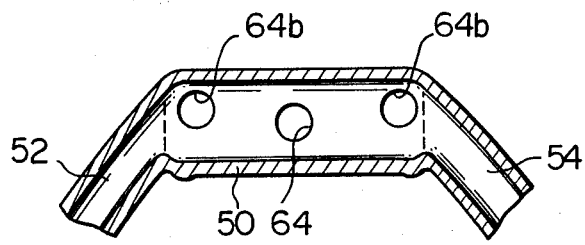
FIG. 3 is a top view of the vaporizer taken along the line III—III of FIG. 2.

Referring also to FIGS. 2 and 3, reference numeral 50 designates an auxiliary intake manifold which is provided with two passages 52 and 54 (see FIGS. 2 and 3), only one being shown in FIG. 1 at 52. Each of the passages 52 and 54 leads to at least one of the engine cylinders so that fuel supplied from the underside of an auxiliary carburetor 56 is supplied to all of the auxiliary combustion chambers, such as 20, of the engine. The auxiliary carburetor 56 is set to provide a rich air-fuel mixture, while the main carburetor 34 is set to provide a lean air-fuel mixture. Some of the fuel supplied from the underside of the auxiliary carburetor 56 is in vaporized form and this mixed with air enters the different passages 52 and 54 to the auxiliary combustion chambers of the engine through a vertical passage 58 and a riser 60.

However, some of the fuel leaving the carburetor 56 is in the form of liquid drops and these enter a chamber of fuel reservoir 62 through an apertured wall 64 and flow down to a heater wall 66 an upperside of which forms the bottom of the chamber 62 and an underside of which is exposed in the exhaust manifold 42. The apertured wall 64, forming the bottom of the riser 60 at its upperside and the top of the chamber 62 at its underside, has formed therethrough at least one hole 64a which is disposed directly below the underside of the carburetor 56 so that the drops of fuel may fall into the chamber 62 through this hole 64a, and has also at least one hole 64b, for each of the intake manifold passages 52 and 54, each of which hole 64b is disposed upstream of each of the intake manifold passages 52 and 54 so that vaporized fuel in the chamber 62 may be drawn into each passage through the hole 64b.

Preferably the chamber 62 may be shallow so that ratio of surface of the heater wall 66 to volume of the chamber 62 may be great enough for rapid vaporization of the drops of fuel within the chamber 62. To prevent the drops of fuel from splashing and/or spilling out of the shallow chamber 62 into the intake manifold 50 the holes 64a and 64b should be disposed inwardly enough of the periphery of the chamber 62 to prevent the drops of fuel from entering the passages 52 and 54.

The apertured wall 64 is made of a heat conductive material and is exposed to radiation of heat from the heater wall 66. Thus the riser 60 also is heated.

Although in the embodiment described in the preceding the heater wall 66 is heated by the exhaust gases, the heater wall 66 may be heated by some other heat source such as bypass water from the cooling system of the engine.

It will now be observed that because the apertured wall 64 exposed to heat radiated from the heater wall 66 heats the riser 60, some of the drops of fuel are vaporized within the riser 60 before the remaining of them drop onto the heater wall 66. This two stage evaporation system is effective for rapid vaporization of the fuel and improve the starting of the engine in cold weather and permits full power acceleration of the engine right after the engine starts up even in cold weather. It will also be observed that the apertured wall 64 prevents the splashing and/or spilling of the drops of fuel from the chamber 62 into the intake manifold 50, while permitting the drops of fuel to enter the chamber 62 and the vapor of fuel to leave the chamber 62 into the intake manifold 50. As a result the drops of fuel are prevented from entering the engine.

What is claimed is:

1. An intake and exhaust manifold system for an internal combustion engine of the type having an auxiliary combustion chamber associated with each main combustion chamber and connected by a torch passage comprising:

a main intake manifold in communication with the main combustion chamber and having a main riser with a bottom;

an auxilary intake manifold in communication with the auxiliary combustion chamber and having an auxiliary riser;

an exhaust manifold in communication with the main combustion chamber;

a first carburetor supported by said main riser for supplying a lean mixture to the main combustion chamber through said main intake manifold;

a second carburetor supported by said auxiliary riser for supplying a rich mixture to the auxiliary combustion chamber through said auxiliary intake manifold;

means on the bottom of said main riser for placing said main riser in thermal communication with said exhaust manifold, said placing means defining a space which prevents air within said main riser from being overheated so as to minimize reduction of the number of air-fuel molecules that enter the main combustion chamber;

an apertured wall having an upper side forming a bottom of said auxiliary riser;

a chamber exposed to and directly below the under side of said second carburetor;

the underside of said apertured wall forming the top of said chamber; and a heater wall having an upper side forming the bottom of said chamber to receive the drops of fuel from said second carburetor, the under side of said heater wall being exposed to the exhaust gases in said exhaust manifold.

2. An intake and exhaust manifold system as claimed in claim 1, in which said apertured wall has at least one first hole formed therethrough, said first hole being disposed directly below the under side of said second carburetor so that drops of fuel will fall into said chamber through said first hole, said apertured wall having at least one second hole formed therethrough for each of branch passages of said auxiliary intake manifold, said second hole being disposed upstream of each of said branch passages so that vaporized fuel in said chamber will be drawn into each of said branch passages through said second hole.

3. An intake and exhaust manifold system as claimed in claim 1, in which said chamber is shallow so that ratio of surface of said heater wall to volume of said chamber is great enough for rapid vaporization of the drops of fuel and in which said first and second holes are disposed inwardly enough of the periphery of said chamber to prevent the drops of fuel from entering each of said branch passages of said auxiliary intake manifold.

4. An intake and exhaust manifold system as claimed in claim 3, in which said apertured wall is exposed to radiation of heat from said heater wall.

* * * * *